US009165274B2

(12) United States Patent
Chaves et al.

(10) Patent No.: US 9,165,274 B2
(45) Date of Patent: Oct. 20, 2015

(54) RFID-BASED DATA REDUCTION SYSTEM AND TECHNIQUES

(75) Inventors: Leonardo Weiss Ferreira Chaves, Karlsruhe (DE); Martin P. Zang, Karlsruhe (DE); Andy Bruntsch, Grossthiemig (DE); Sascha H. Alpers, Pfinztal (DE)

(73) Assignee: SAP SE, Walldorf (DE)

( * ) Notice: Subject to any disclaimer, the term of this patent is extended or adjusted under 35 U.S.C. 154(b) by 2122 days.

(21) Appl. No.: 12/260,947

(22) Filed: Oct. 29, 2008

(65) Prior Publication Data

US 2010/0102935 A1    Apr. 29, 2010

(51) Int. Cl.
| | |
|---|---|
| H04Q 5/22 | (2006.01) |
| G08C 19/16 | (2006.01) |
| G05B 19/00 | (2006.01) |
| G06Q 30/00 | (2012.01) |
| G06Q 10/08 | (2012.01) |
| G06K 19/07 | (2006.01) |
| H04W 4/00 | (2009.01) |
| H04W 4/02 | (2009.01) |
| G06K 17/00 | (2006.01) |

(52) U.S. Cl.
CPC ............ *G06Q 10/08* (2013.01); *G06K 19/0723* (2013.01); *H04W 4/008* (2013.01); *H04W 4/028* (2013.01); *G06K 2017/0045* (2013.01); *H04Q 2213/13003* (2013.01)

(58) Field of Classification Search
USPC ............................ 341/51; 370/338; 340/572.1
See application file for complete search history.

(56) References Cited

U.S. PATENT DOCUMENTS

| | | | | |
|---|---|---|---|---|
| 2004/0140884 A1* | 7/2004 | Gallagher et al. | ........... | 340/10.2 |
| 2005/0243784 A1* | 11/2005 | Fitzgerald et al. | ........... | 370/338 |
| 2006/0170534 A1* | 8/2006 | Arneson et al. | ............. | 340/10.2 |
| 2006/0187094 A1* | 8/2006 | Kaplan et al. | ................... | 341/51 |
| 2007/0024426 A1* | 2/2007 | Akiyama et al. | ............. | 340/10.5 |
| 2007/0188306 A1* | 8/2007 | Tethrake et al. | ........... | 340/10.51 |
| 2007/0194889 A1* | 8/2007 | Bailey et al. | ............... | 340/10.51 |
| 2007/0229328 A1* | 10/2007 | Schultz et al. | .................. | 341/67 |
| 2008/0001752 A1* | 1/2008 | Bruns et al. | ................ | 340/572.1 |
| 2008/0224913 A1* | 9/2008 | Suzuki et al. | ................ | 341/155 |
| 2009/0102612 A1 | 4/2009 | Dalbow et al. | | |

OTHER PUBLICATIONS

"Technical Report: 13.56 MHz ISM Band Class 1 Radio Frequency Identification Tag Interface Specification: Candidate Recommendation, Version 1.0.0", Auto-ID Center, Massachusetts Institute of Technology, (Feb. 1, 2003), 33 pgs.
"Technical Report: 860 MHz-930MHz Class I Radio Frequency Identification Tag Radio Frequency & Logical Communication Interface Specification Candidate Recommendation, Version 1.0.1", Auto-ID Center, Massachusetts Institute of Technology, (Nov. 14, 2002), 19 pgs.

(Continued)

*Primary Examiner* — Jennifer Mehmood
*Assistant Examiner* — Pameshanand Mahase
(74) *Attorney, Agent, or Firm* — Brake Hughes Bellermann LLP

(57) ABSTRACT

A method for tracking events using a radio frequency identification (RFID) tag may include reserving a bit window in a memory on a radio frequency identification (RFID) tag, the bit window having multiple bits, randomly marking one of the bits in the bit window each time a RFID event occurs, counting a number of marked bits in the bit window, and determining a number of the RFID events using the counted number of the marked bits and a size of the bit window.

26 Claims, 7 Drawing Sheets

(56) References Cited

OTHER PUBLICATIONS

"Draft protocol specification for a 900 MHz Class 0 Radio Frequency Identification Tag", Auto-ID Center, Massachusetts Institute of Technology, (Feb. 23, 2003), 49 pgs.
"The Application Level Events (ALE) Specification, Version 1.1, Part I: Core Specification", GS1, EPCglobal, (Feb. 27, 2008), 225 pgs.
"The Application Level Events (ALE) Specification, Version 1.1, Part II: XML and Soap Bindings", GS1, EPCglobal, (Feb. 27, 2008), 118 pgs.
Armenio, Felice et al., "The EPCglobal Architecture Framework, EPCglobal Final Version 1.2", GS1, EPCglobal, (Sep. 10, 2007), 64 pgs.
"EPCglobal Certificate Profile, Ratified Specification with Approved, Fixed Errata, Version 1.0.1", GS1, EPCglobal, (May 14, 2008), 12 pgs.
"EPC Information Services (EPCIS) Version 1.0.1 Specification", GS1, EPCglobal, (Sep. 21, 2007), 146 pgs.
"Low Level Reader Protocol (LLRP), Version 1.0.1, Ratified Standard with Approved Fixed Errata", EPCglobal, (Aug. 13, 2007), 194 pgs.
"EPCglobal Object Name Service (ONS) 1.0.1, Ratified Standard Specification with Approved, Fixed Errata", GS1, EPCglobal, (May 29, 2008), 25 pgs.
"Pedigree Ratified Standard, Version 1.0", EPCglobal, (Jan. 5, 2007), 138 pgs.
"Reader Management 1.0.1", EPCglobal, (May 31, 2007), 242 pgs.
"Reader Protocol Standard, Version 1.1, Ratified Standard", EPCglobal, (Jun. 21, 2006), 275 pgs.
"EPCglobal Tag Data Standards Version 1.4", EPCglobal, (Jun. 11, 2008), 120 pgs.
"EPCglobal Tag Data Translation (TDT) 1.0, Ratified Standard Specification", EPCglobal, (Jan. 21, 2006), 107 pgs.
"Specification for RFID Air Interface, EPC Radio-Frequency Identity Protocols, Class-1 Generation-2 UHF RFID Protocol for Communications at 860 MHz—960MHz, Version 1.1.0", EPCglobal, (Dec. 17, 2005), 100 pgs.

\* cited by examiner

200

|  | Command | WordPtr | BitPos |
|---|---|---|---|
| Usage of bits | 1 | EBV | cf. WordPtr |
| Description | 1 | Address Pointer | Exact binary bit position |

FIG. 2

RFID-BASED DATA REDUCTION SYSTEM AND TECHNIQUES

TECHNICAL FIELD

This description relates to a radio frequency identification (RFID)-based data reduction system and techniques.

BACKGROUND

Many different groups (e.g., governments, companies, research institutes, and other organizations) are interested in information based on atomic actions of (in most cases) humans. For example, companies may attempt to study the habits of their customers and may search for a better understanding of their customers buying and spending habits to optimize their offerings to better server their customers and to increase the opportunity for selling more offering, which may lead to higher profits for the companies.

The more information that is known about customer events related to an offering, the better companies can serve their customers and potential customers. For example, the more detailed event information related to a customer's interaction with a product that can be tracked, then the more understanding the company can gain about the product. However, the more detailed the tracking, the more event and research data that is generated, which may need to be stored for eventual analysis. The enormous amounts of data created from the tracking may create storage and infrastructure problems. Consequently, systems and techniques are desirable to track more detailed events and to gain more data and information, but without the potential overwhelming storage and infrastructure requirements for the data.

SUMMARY

In one exemplary implementation, radio frequency identification (RFID) tags may be used to track real-time item level events and the event data may be stored in the memory of the RFID tag itself. The aggregated event data stored on the RFID tag may be read into a central repository at a desired time. A communication protocol may be used to communicate with the RFID tag that enables the use of a multi-cast write command, which enables direct writes to the RFID tag without prior communication with the RFID tag.

In one exemplary implementation, a bit window technique may be used to reduce the amount of data required to be stored, yet at the same time still collect and gather the desired data useful for event tracking at the item level. For example, a bit window technique may be used to track how often an event happens concerning a RFID-labeled product. In this technique, a bit window may be reserved on the RFID tag and each time an event occurs with the RFID-labeled product, a random bit in the bit window may be marked. The number of marked bits may be counted and the number of happened events may be estimated using this information.

In another exemplary implementation, another technique may be used to capture even more detailed information regarding movements of RFID tags. Each time a RFID event occurs, a RFID interrogator having a unique writer identifier may read the RFID tag to check the last writer identifier written to the tag. If the last writer identifier does not match the unique writer identifier for that interrogator, then the RFID interrogator broadcasts a write command to write a data packet to the RFID tag that includes a timestamp and the unique writer identifier. At a later time, the RFID interrogator may read the data packets from the RFID tag and aggregate the data packets, which may be related to a particular product. The RFID interrogator may transfer the aggregated data to a central repository for further analysis.

According to one general aspect, a method for tracking events using a radio frequency identification (RFID) tag may include reserving a bit window in a memory on a radio frequency identification (RFID) tag, the bit window having multiple bits, randomly marking one of the bits in the bit window each time a RFID event occurs, counting a number of marked bits in the bit window and determining a number of the RFID events using the counted number of the marked bits and a size of the bit window.

Implementations may include one or more of the following features. For example, randomly marking one of the bits in the bit window may include receiving a write command at the RFID tag from a RFID interrogator without using a handshake between the RFID tag and the RFID interrogator. Randomly marking one of the bits in the bit window may include broadcasting a write command to write a bit to the RFID tag without reading any data from the RFID tag prior to broadcasting the write command. Randomly marking one of the bits in the bit window may occur when the RFID tag crosses a writing area. The method may include reading the marked bits from the RFID tag.

Reserving the bit window in the memory on the RFID tag may include reserving multiple bit windows in the memory on the RFID tag, where the multiple bit windows each represent a different event to be tracked and randomly marking one of the bits in the bit window may include randomly marking one of the bits in one of the bit windows in response to an occurrence of a RFID event corresponding to the bit window.

In another general aspect, a method for tracking events using a radio frequency identification (RFID) tag may include detecting a radio frequency identification (RFID) tag when the RFID tag crosses a writing area for a RFID interrogator, where the RFID interrogator may be associated with a unique writer identifier, reading a last writer identifier from the RFID tag, writing a data packet to the RFID tag when the last writer identifier does not match the unique writer identifier of the RFID interrogator that detected the RFID tag, the data packet including a timestamp and the unique writer identifier associated with the RFID interrogator that detected the RFID tag and storing the data packet on the RFID tag in a memory of the RFID tag, where the memory may be configured to store multiple data packets.

Implementations may include one or more of the following features. For example, the method may include reading the stored data packets from the RFID tag, aggregating the data packets related to a product, and transferring the aggregated data packets to a central data repository. Writing the data packet may include writing the data packet to the RFID tag using a block write command.

In another general aspect, a system may include a radio frequency identification (RFID) tag that includes an antenna and a memory, the memory including a bit window having multiple bits, a RFID interrogator comprising an antenna and a radio frequency module, where the RFID interrogator is configured to communicate with the RFID tag and to randomly mark one of the bits in the bit window each time a RFID event occurs and a control module that is configured to count a number of marked bits in the bit window and to determine a number of the RFID events using the counted number of the marked bits and a size of the bit window.

Implementations may include one or more of the following features. For example, the control module may be a component of the RFID interrogator. The RFID interrogator may be configured to read the number of marked bits from the RFID tag and to communicate the number of marked bits to the control module, where the control module is s component of a remote central repository. The RFID interrogator may be configured to randomly mark one of the bits in the bit window by broadcasting a write command to write a bit to the RFID tag without reading any data from the RFID tag prior to broadcasting the write command.

The memory in the RFID tag may include multiple bit windows, where the bit windows each represent a different event to be tracked and the RFID interrogator may be configured to randomly mark one of the bits in one of the bit windows in response to an occurrence of a RFID event corresponding to the bit window.

In one exemplary implementation, the RFID tag is configured to randomly select which one of the bits is to be marked. In another exemplary implementation, the RFID interrogator is configured to randomly select which one of the bits is to be marked.

In another general aspect, a system may include a radio frequency identification (RFID) tag that includes an antenna and a memory, a RFID interrogator that includes an antenna, a radio frequency module and a unique writer identifier, where the RFID interrogator is configured to detect the RFID tag when the RFID tag crosses a writing area for the RFID interrogator, read a last writer identifier from the RFID tag, and write a data packet to the RFID tag when the last writer identifier does not match the unique writer identifier for the RFID interrogator that detected the RFID tag, where the data packet includes a timestamp and the unique writer identifier associated with the RFID interrogator that detected the RFID tag.

Implementations may include one or more of the following features. For example, the RFID tag may be configured to store multiple data packets in the memory and the RFID interrogator may be configured to read the stored data packets from the RFID tag. The RFID interrogator may include a control module that is configured to aggregate the data packets related to a product. The system may include a central data repository, where the RFID interrogator may be configured to transfer the aggregated data packets to the central data repository.

In another general aspect, a radio frequency identification (RFID) tag may include an antenna that is configured to receive one or more commands, a memory that includes a bit window, where the bit window has multiple bits and a control module that is configured to control the antenna and the memory and that is configured to receive and to process a write command to randomly mark one of the bits in the bit window each time a RFID event occurs.

Implementations may include one or more of the following features. For example, the control module may be configured to randomly select which one of the bits in the bit window is marked. In another exemplar implementation, the received write command includes which one of the bits in the bit window is marked. The control module may be configured to receive and to process the write command without using a handshake with a RFID interrogator.

The details of one or more implementations are set forth in the accompanying drawings and the description below. Other features will be apparent from the description and drawings, and from the claims.

BRIEF DESCRIPTION OF THE DRAWINGS

FIG. 2 is an exemplary table of a write command and its attributes.

DETAILED DESCRIPTION

Figure 1:
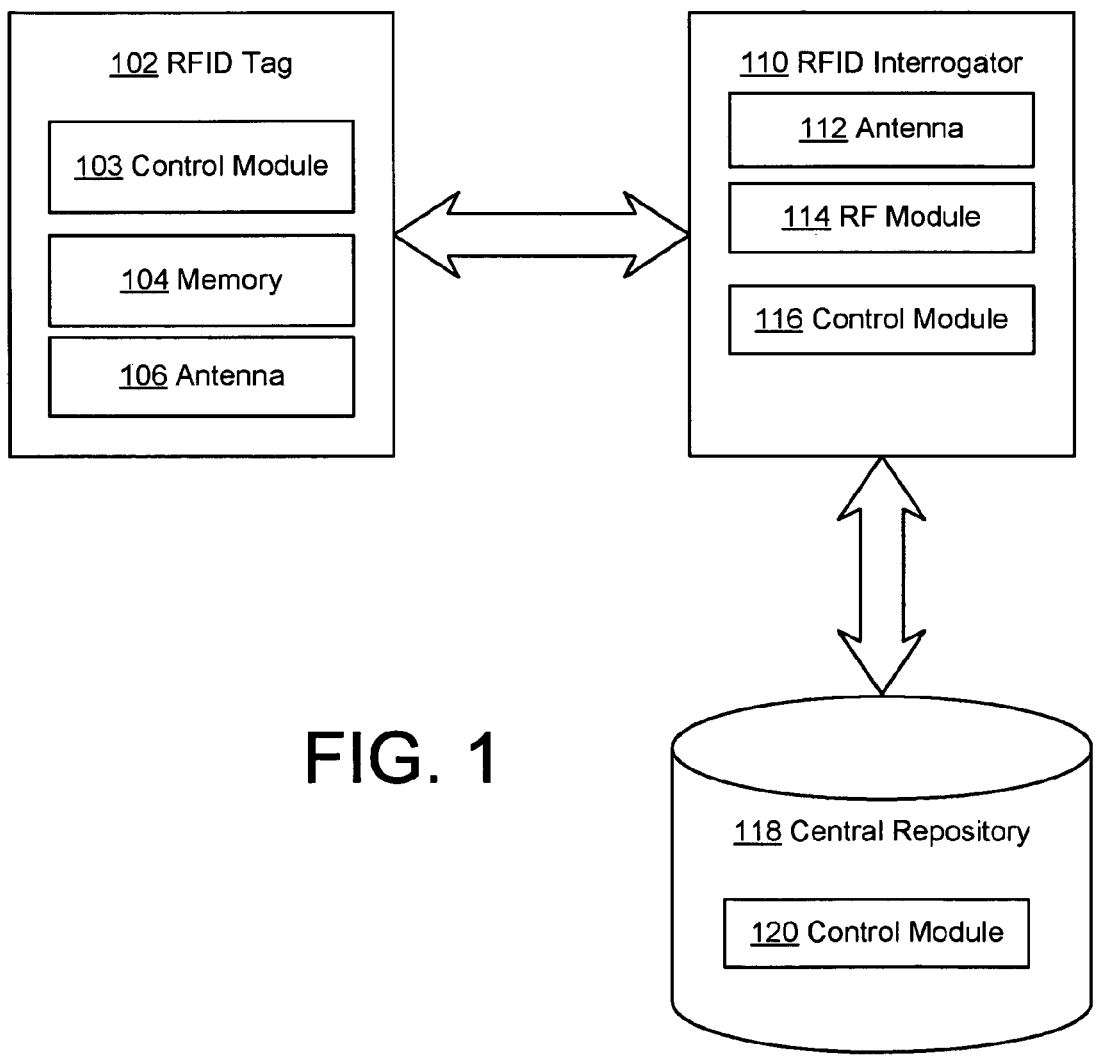
FIG. 1 is a block diagram of a system for a RFID-based data reduction system.

FIG. 1 is a block diagram of a system 100 for a RFID-based data reduction system. The system 100 may include a RFID tag 102, where the RFID tag 102 may include a control module 103, a memory 104 and an antenna 106. The system 100 also may include a RFID interrogator 110, which includes an antenna 112, a radio frequency (RF) module 114 and a control module 116. The system 100 also may include a central repository 118, which may include a control module 120. Although system 100 represents the RFID tag 102 and the RFID interrogator 110 as single entities, it is to be understood that the system 100 may include multiple, different RFID tags 102 and multiple, different RFID interrogators 110. For example, the system 100 may be used in a warehouse or in a store to track information about the items in the warehouse or in the store. Each of the items in the warehouse or in the store may have its own unique RFID tag 102 and there may be multiple RFID interrogators 110 throughout the warehouse or the store. Each of the RFID interrogators 110 may define a writing area, where each of the RFID interrogators is designated to track the items as the RFID tags 102 pass through the respective writing area.

The RFID tag 102 may be a transponder that is arranged and configured to communicate with the RFID interrogator 110. The RFID tag 102 may be an active tag, a passive tag or a semi-passive tag. The RFID tag 102 may include the control module 103, which may be a processing chip that is configured to receive commands from the RFID interrogator 110 and to process those commands. Commands are received and data may be communicated through the antenna 106.

The memory 104 may be configured to store data related to RFID events. The use of the memory 104 as temporary storage for events may help reduce the amount of overall data that is communicated to a central repository. The RFID tag 102 also may be used for some preprocessing of data. The memory 104 may be a separate module and/or it may be a part of the control module 103.

A RFID event may be anytime that the RFID interrogator 110 detects the RFID tag 102. For example, a RFID event may include anytime that the RFID tag 102 is moved within the writing area of the RFID interrogator 110. The writing area of the RFID interrogator 110 may be the physical area for which the RFID interrogator can communicate with RFID tags.

In one exemplary implementation, the RFID tag 102 is a passive tag such that a power source may not be needed on the RFID tag 102. Instead, the RFID tag 102 may receive the power it needs from the energy field created by the RFID interrogator 110. The RFID tag 102 may gain the energy needed for receiving signals, processing the signals and sending signals from the electromagnetic field created by the RFID interrogator 110. The RFID tag 102 may communicate with the RFID interrogator 104 using the modulation of the RFID interrogator's wave. In other exemplary implementations, the RFID tag 102 may include a power source such as, for example, a battery, which may provide the power that the RFID tag 102 may need to perform its functions.

The RFID tag 102 may be configured such that it can be affixed to many different types of items. The RFID tag 102 may be any size and may be configured such that it is hidden on or within an item so as not to interfere with the item or the look and design of the item. As discussed above, the RFID tag 102 may be used to tag items in a warehouse or products in a store.

The RFID interrogator 110 may include the antenna 112, the RF module 114 and the control module 116. The RFID interrogator 110 may be configured to write data to the RFID tag 102 and to read data from the RFID tag 102. The RFID interrogator 110 also may be configured to communicate with other computing systems and computing devices including, for example, central repository 118.

The antenna 112 is used to communicate with the RFID tag 102 and with other system such as the central repository 118. The RF module 114 may be configured to produce transmission power needed for transmitting a signal and the modulation of the transmitter signal. The RF module 114 also may be configured to demodulate signals received through the antenna 112.

The communication between the RFID interrogator 110 and the RFID tag 102 may be a wireless communication operating in the frequency range of 860 MHz to 960 MHz. Other frequency ranges are possible. In one exemplary implementation, the air interface between the RFID interrogator 110 and the RFID tag 102 may be governed by ISO 18000-6. The RF module 114 in the RFID interrogator 110 generates electromagnetic waves, which may provide the activation and the energy supply to the RFID tag 102.

The communication between the RFID interrogator 110 and the central repository 118 may be over any wired and/or wireless network. For example, the information between the two entities may be communicated over a wireless RF interface using electromagnetic waves generated by the RF module 114. Additionally and/or alternatively, the RFID interrogator 110 may include a port or other interface that enables the device to communicate over a wired network such as, for example, the Internet.

The control module 116 may be configured to control the operation of the overall unit including the antenna 112 and the RF module 114. The control module 116 may include one or more processors or chips that may include or more application programs or computer program products or software that control the operation of the device. The control module 116 may generate commands to send to other devices and RFID tags 102 including write commands and read commands. The RFID interrogator 110 may include a memory (not shown), which may be configured to store the application program or software, which then may be loaded into the control module 116 when needed to operate the device. The control module 116 also may be configured to code and decode the sent and received signals.

The central repository 118 may be configured to store data and to enable for the searching and analyzing of the stored data. The central repository 118 may include a control module 120, which may be configured to perform operations on the data collected by the RFID interrogator 110 from the RFID tag 102.

In one exemplary implementation, the RFID interrogator 110 may be configured to send a write command to the RFID tag 102 without having had or relying on any previous communications with the RFID tag 102. The RFID interrogator 110 may use this write command to write on the RFID tag 102 directly. For example, the RFID interrogator 110 may write a bit directly to the memory 104 on the RFID tag 102. In this manner, many of the complex and cumbersome communication steps between the RFID interrogator 110 and the RFID tag 102 are eliminated. In this manner, the process of authorization between the RFID interrogator 110 and the RFID tag 102 is eliminated, which provides for data reduction and more efficient communications. Additionally, in this manner, a faster data transmission is realized between the RFID interrogator 110 and the RFID tag 102. The faster data transmission enables the RFID interrogator 110 to send data to multiple RFID tags at the same or substantially the same time.

For example, the following communication steps may be eliminated between the RFID interrogator 110 and the RFID tag 102: 1) Interrogator issues a query; 2) Tag responds with RN16; 3) Acknowledge with ACK (RN16); 4) Tag responds with EPC, PC; 5) Interrogator issues new RN with REQ_RN (RN16); and 6) Tag responds with handle. Instead, the RFID 110 may send a single command to the RFID tag 102, without having had or needing any prior communication, to write directly to the memory 104 of the RFID tag 102.

The use of the single write command also may reduce the complexity of the RFID tag 102. A chip on the RFID tag 102 may no longer need a complex finite state machine because of the improved communications and reduction of many communication steps. Thus, a simpler, less complex and consequently less expensive, more cost efficient chip may be used on the RFID tag 102.

Referring to FIG. 2, a table 200 of the attributes of the write command are illustrated. The table 200 illustrates a command attribute in the column labeled "Command" and illustrates two memory addressing attributes in the columns labeled "WordPtr" and "BitPos." The write command includes fewer attributes than previous write commands and, thus, provides for more efficient communications.

The "Command" attribute may be an identifier that is configured to identify the particular command to the RFID tag 102 so the RFID tag 102 knows how to process the command. Table 200 illustrates that this attribute may be a single bit and that the identifier is a "1". When the RFID tag 102 receives this command from the RFID interrogator 110, the identifier "1" indicates the particular command so that the RFID tag 102 knows how to handle and process the command. Thus, the first attribute may be a description of the command, where the coding has been chosen to be as small as possible.

The "WordPtr" attribute may be an extensible bit vector (EBV), which is a data structure to represent the position or address of the memory. This attribute may identify which bit window is being written to in the memory 104. Thus, this attribute acts as an address pointer to define the area of the tag to write. In one exemplary implementation, an address pointer for bit blocks may be used. In another exemplary implementation, a memory range specification for the first and last bit may be used. The "WordPtr" attribute may not be used if the memory range has been previously reserved on the RFID tag 102 so that the RFID tag 102 knows where in memory to write the bit when the command is received.

The "BitPos" attribute may be used to define a relative position as to where the bit may be written in relation to the memory 104 range defined by the "WordPtr" attribute. In one exemplary implementation, the attributes related to the write command may be calculated and determined by the control module 116. Calculating the "BitPos" may be a random selection by the control module 116.

In another exemplary implementation, the control module 103 on the RFID tag 102 may be configured to randomly select the relative bit position in the bit window that is to be written. In this manner, the "BitPos" attribute may be omitted from the write command such that the command is even shorter, which may result in even faster and more efficient communications and event tracking In this manner, the RFID interrogator 110 may broadcast the write command without communicating with a specific RFID tag 102. Additionally, the RFID interrogator 110 does not need to read any data from the RFID tag 102 as part of the writing process. This write command may be used with various techniques discussed in this document. The logic is included in the writing command itself, so there are no special routines or processes needed on the RFID tag 102 to implement the command.

Since the steps of authorization are eliminated because they are no longer needed, the process of writing to the RFID tag 102 is faster. The RFID tag 102 needs less functionality and therefore may be less complex. For instance, the complex logic concerning the EPCglobal specification may be omitted.

Figure 3:
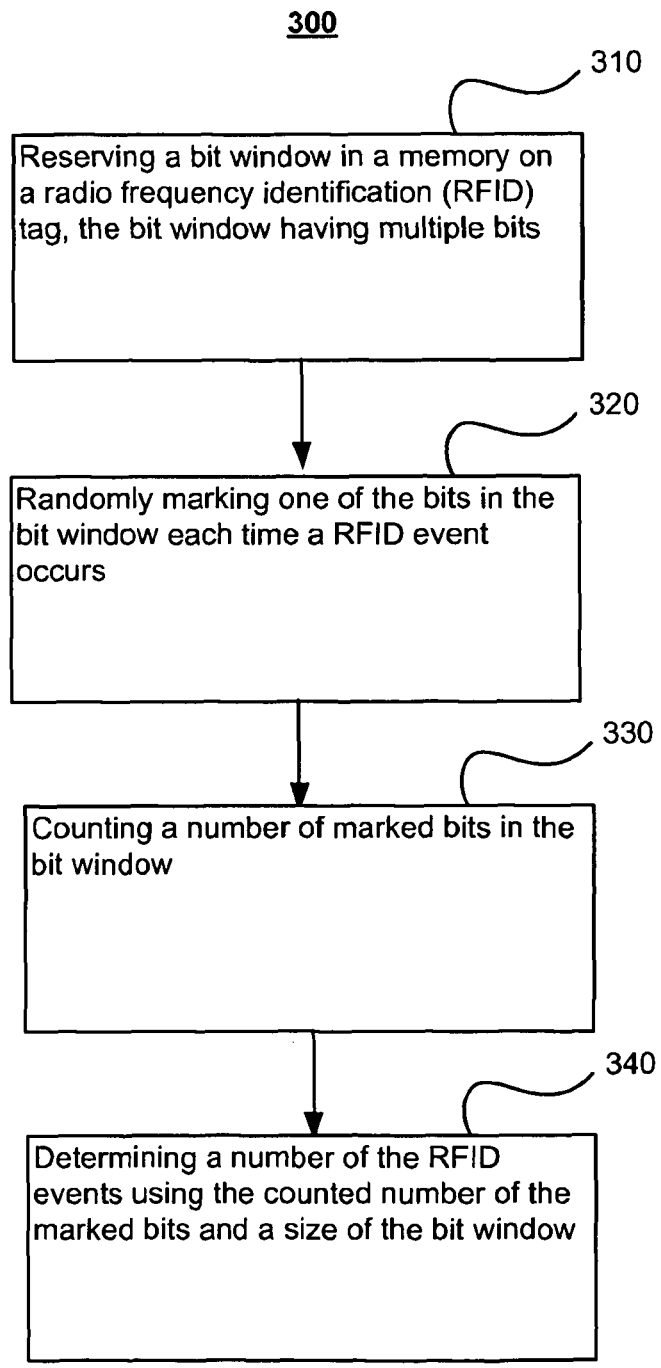
FIG. 3 is an exemplary flowchart illustrating example operations of the system of FIG. 1.

Referring to FIG. 3, an exemplary flowchart of a process 300 for tracking events using a RFID tag is illustrated. Process 300 may include reserving a bit window in a memory on a RFID tag, where the bit window has multiple bits (310). One of the bits in the bit window may be randomly marked each time a RFID event occurs (320). A number of marked bits in the bit window may be counted (330) and a number of the RFID events may be determined using the counted number of the marked bits and a size of the bit window (340).

In one exemplary implementation, process 300 may be used to track how often a specific event happens concerning a RFID tag (e.g., RFID tag 102) and a product, which is labeled with this tag. Specific events, for example, are the RFID events. For instance, a RFID event could be that the product is taken off of the shelf in a store or a RFID event could be each time that the product is tested.

The bit window in the memory (e.g., memory 104) may be used for each specific kind of RFID event that is to be tracked. The memory 104 may include multiple bit windows so that multiple, different RFID events can be tracked using the same RFID tag 102. In this manner, a product that has the RFID tag may be tracked for different events and the number of times that those different events occur.

A bit window in the memory 104 may be of different sizes. For example, a bit window having 10 bits may be used for the product test RFID events and a different bit window having 15 bits may be used to count the take off the shelf events.

Each time a RFID event occurs, one of the bits in the bit window may be randomly marked (320). For example, the RFID interrogator 110 may be configured to detect the RFID event and to randomly mark one of the bits in the bit window. In the example of tracking a product each time it is picked off the shelf, a RFID interrogator 110 may be placed on or near the shelf such that the writing area for the RFID interrogator covers the desired products that have the RFID tags. In some scenarios, multiple RFID interrogators 110 may be used. The RFID event may occur each time a RFID tag crosses into a writing area for a particular RFID interrogator.

In one exemplary implementation, the RFID interrogator 110 may broadcast the write command, as discussed above, to write a bit to the bit window without reading any data from the RFID tag 102 prior to broadcasting the write command. The write command is received at the RFID tag 102 without using a handshake or other protocols between the RFID tag 102 and the RFID interrogator 110. When the write command is received, a "1" may be written to a random bit within the bit window. It is not necessary for the RFID interrogator 110 to know the as-is state of the random bit, the as-is state of the outer bits in the window or any other data from the RFID tag 102. The RFID interrogator 110 may be configured to select a bit by a random function and send the broadcast write command to the writing area where the event occurred. Each time a RFID event occurs, the RFID interrogator 110 broadcasts the write command to mark a random bit in the bit window.

In one exemplary implementation, the RFID tag 102 may be configured to randomly select a bit to be set when a write command is received from the RFID interrogator 110. For example, instead of the RFID interrogator 110 randomly selecting the bit in the bit window, the control module 103 on the RFID tag 102 may be configured to randomly make the bit selection.

When multiple RFID tags 102 have a RFID event at the same time, the single write command from a single RFID interrogator 110 may suffice to write a bit to the bit window on each of the RFID tags.

Figure 4:
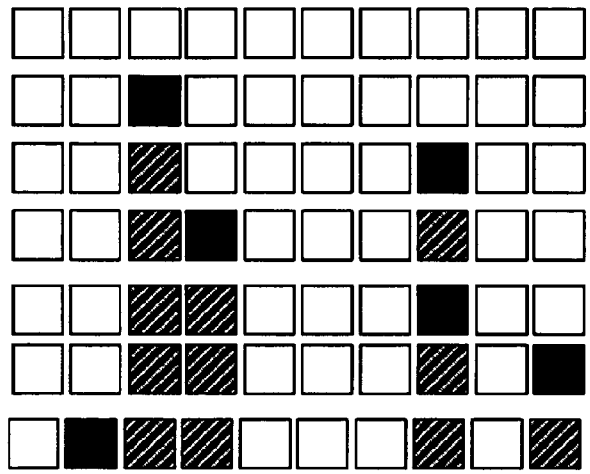
FIG. 4 is an exemplary chart illustrating a bit window and the markings in the bit window after different RFID events.

Referring also to FIG. 4, a chart 400 illustrates an example bit window that is 10 bits in length and that shows bit markings after different events. The top line of the chart 400 shows that all 10 bits in the bit window are unmarked (i.e., set to "0") at the beginning When a RFID event occurs, the write command is received at the RFID tag 102 from the RFID interrogator 110 and a bit, which may be randomly selected by the RFID interrogator 110, is marked. In this example, after event 1, the third bit in the bit window is overwritten with a "1". After event 2, eighth bit is marked by overwriting it with a "1" so that after event 2 both the third bit and the eighth bit are marked.

After event 4, the random function randomly selected the eighth bit again to be marked. The function is not aware of the marked bits. In this case, a "1" is written to the eighth bit anyway and it overwrites the previous "1" with another "1".

The RFID interrogator 110 may be configured to read the marked bits from the RFID tag 102 and to count a number of the marked bits in the bit window. For example, the control module 116 may be configured to count the number of marked bits. In the scenario where the RFID tag 102 includes multiple different bit windows, the multiple bit windows may be read by the RFID interrogator 110 and the control module 116 may count the number of marked bits in the bit window.

The RFID interrogator 110 may be configured to read the RFID tag 102. For example, in a store or a warehouse, a RFID interrogator 110 may be located at the store checkout or warehouse exit so that RFID tags may be read before the product having the tag leaves the store or the warehouse, as the case may be. Additionally, one or more RFID interrogators 110 may be placed by the store shelves to read the RFID tags 102 each night, for instance, so that the marked bits for the products still in the store may be read and analyzed. Once the RFID tag 102 has been read, the bit windows may be reset to all unmarked (i.e., all set to "0").

In one exemplary implementation, the control module 116 may be configured to determine a number of the RFID events using the counted number of the marked bits and the size of the bit window (340). In another exemplary implementation, the RFID interrogator 110 may communicate the number of marked bits and the size of the bit window to the central repository 110 and the control module 120 may determine the number of RFID events using the received information.

The control module (e.g., control module 116 or control module 120) may determine the number of RFID events by estimating the quantity of the happened events. The probability of the realistic amount of happened events may be calculated using the current bit window state. After determining the probability, the number of events with the biggest probability to cause the marked bits may be chosen. The following equations may be used in the calculations:

$$P_n(m, e, w) = \frac{P_e(m, e, w)}{\sum_{i=0}^{\infty} P_e(m, i, w)}; m > 0 \wedge e > 0$$

$$P_n(m, e, w) = 1; m = 0 \wedge e = 0$$

$$P_n(m, e, w) = 0; m = 0 \veebar e = 0$$

$$P_e(m, e, w) = P_e(m-1, e-1, w) * \left(\frac{1 - \frac{m-1}{w}}{}\right) + \left(\frac{P_e(m, e-1, w) * \frac{m}{w}}{}\right)$$

$m$ = number of marked bits $\geq 0$ $e$ = number of events $\geq 0$ $w$ = width of the bit window
 = quantity of bits in the reserved area $> 0$ $P_e$ (m,e,w) is a recursive function. The function calculates the probability that a defined number of events set a number of bits. For the realization, the function uses the path rule and calculates the result by using the probability of the parents. To get the probability distribution for a defined number of bits and a variable number of events the sum may be normalized to one.

Below are the functions implemented as code:

```
function Pe($m, $e,$w){
    //m=marked bits
    //e=number of events
    //w=width of the windows
    if ( $m<0 || $e<0 || $w<=0){
        return "Error";
    }
    if ($m==0 && $e==0){
        return 1;
    }
    if ($m==0 || $e==0){
        return 0;
    }
    return
    Pe($m-1,$e-1,$w)*(1-(($m-1)/$w))+Pe($m,$e-1,$w)*($m/$w);
}
function Pn($m,$e,$w){
    //m=marked bits
    //e=number of events
    //w=width of the windows
    if ($m<0 || $e<0 || $w<=0){
        return "Error";
    }
    $i=0;
    $sum=0;
    while ($i<=200){
        //for areas smaller than 50 bits 200 are enough
        // - infinity is not necessary
        $sum+=Pe($m,$i,$w);
        $i++;
    }
    return Pe($m,$e,$w)/($sum);
}
```

In one exemplary implementation, the control module may calculate the probabilities only one time for each bit width window and store it as a table, so that it can work faster and be applied when the number of marked bits and the size of the particular bit window are received.

Figure 5:
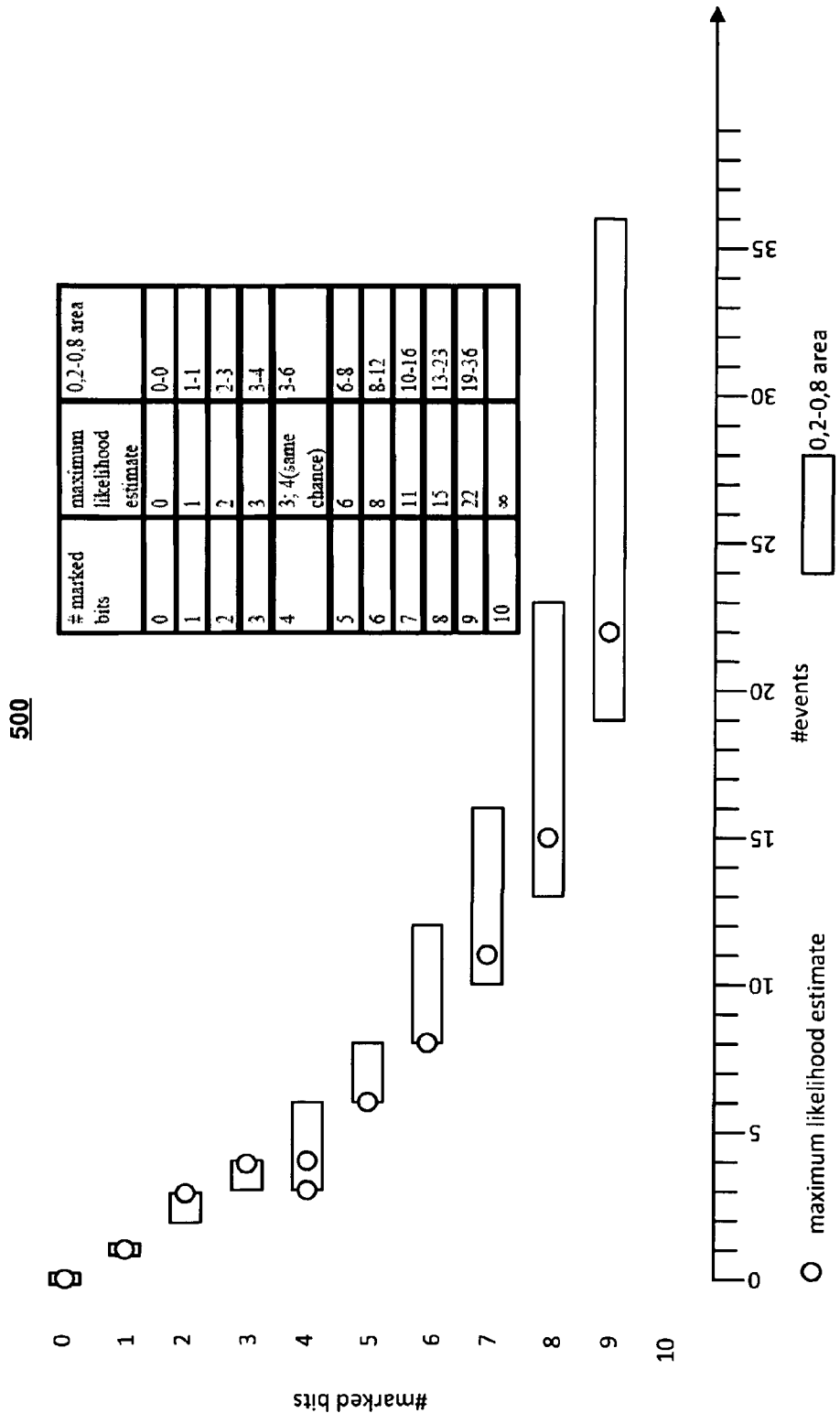
FIG. 5 is an exemplary graph illustrating a probability of marked bits in a bit window.

Referring to FIG. 5, a chart 500 illustrates the number of marked bits on the vertical axis and the number of events on the horizontal axis. To see the exactness of the estimate, the bars correspond to a confidence interval of 0.2-0.8.

If all bits in the area are marked, then no estimation may be possible. The probability rises with the rising number of events. The biggest likelihood therefore may have an infinite amount of events. The variance gets a fortiori greater, the smaller the number of unmarked bits gets. The width of the bit window may be an important factor for the estimate. The factors that may go into deciding the appropriate bit width may include an anticipation about the maximum number of events that may occur and the memory for the bit widths should be a larger number (e.g., 15% greater).

Figure 6:
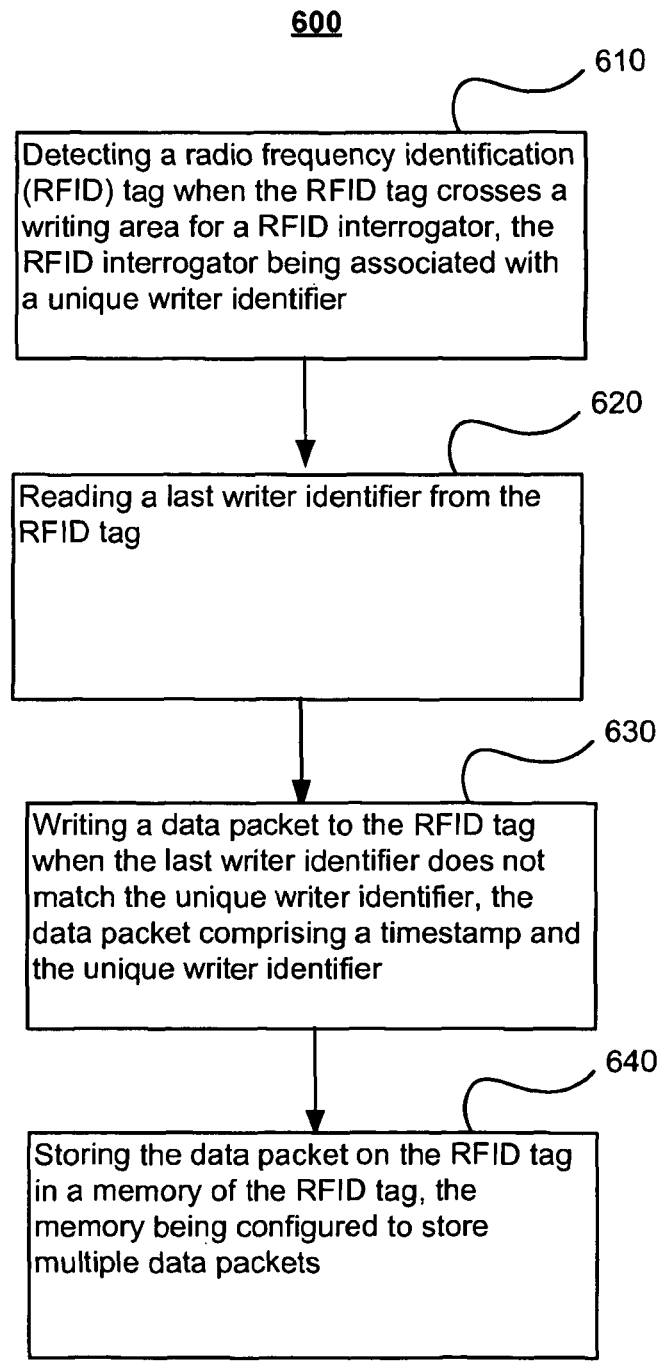
FIG. 6 is an exemplary flowchart illustrating example operations of the system of FIG. 1.

Referring to FIG. 6, an exemplary flowchart of a process 600 for tracking events using a RFID tag is illustrated. Process 600 may include detecting a RFID tag when the RFID tag crosses a writing area for a RFID interrogator, where the RFID interrogator is associated with a unique writer identifier (610). The last writer identifier written to the RFID tag may be read (620) and a data packet may be written to the RFID tag when the last writer identifier does not match the unique writer identifier of the RFID interrogator that detected the RFID tag (630). The data packet may include a timestamp and the unique writer identifier of the RFID interrogator. The data packet may be stored on the RFID tag in a memory of the RFID tag, where the memory may be configured to store multiple data packets (640).

In one exemplary implementation, process 600 may be used to capture nearly every movement of a tagged product within a specified area. For example, in a retail setting, each shelf and all corridors or aisles may include a RFID interrogator 110. To gain maximum information relating to the product movements, the occurring events may be saved on the RFID tag 102.

For instance, the RFID interrogator 110 may be configured to detect when the RFID tag 102 crosses a writing area for the RFID interrogator 110 (610). Each RFID interrogator 110 may have its own unique writer identifier. The RFID interrogator 110 may read the last writer identifier that was written to the RFID tag 102 from the memory 104 of the RFID tag 102. If the last writer identifier is different from the writer identifier of the RFID interrogator 110, then the data packet capturing the event information may be written to the memory 104 of the RFID tag 102.

The data packet may include a timestamp and the unique writer identifier of the RFID interrogator 110. In one exemplary implementation, the timestamp may have a length of 17 bits, which enables tracking of events that cover a time span of approximately 36 hours with a resolution of one second. In other implementations, other bit lengths for the timestamp may be used to provide cover different time spans at different resolutions.

Figure 7:
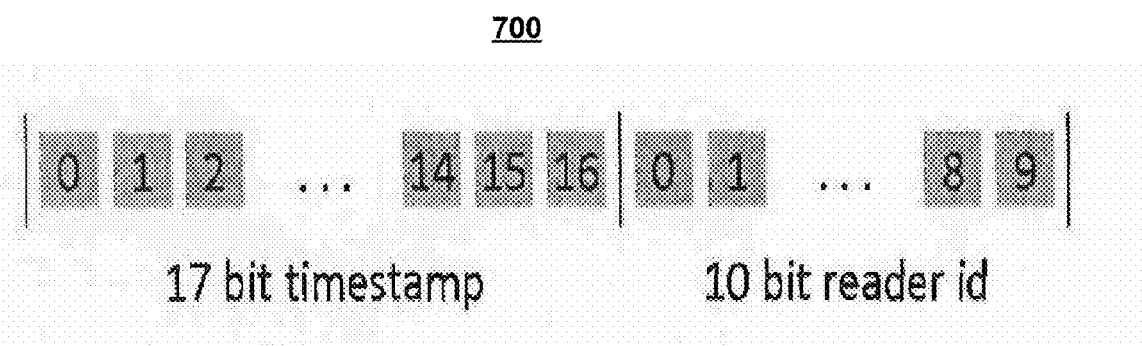
FIG. 7 is an exemplary block diagram illustrating an example data packet.

The length of the writer identifier may vary and depend on the number of RFID interrogators that are being used. Referring to FIG. 7, an exemplary block diagram of an example data packet 700 is illustrated. The data packet 700 includes a 17 bit timestamp and a 10 bit writer identifier (referred to as a 10 bit reader id in the diagram). In one exemplary implementation, the data packets may be stored in sequential data packets in the memory 104.

Figure 8:
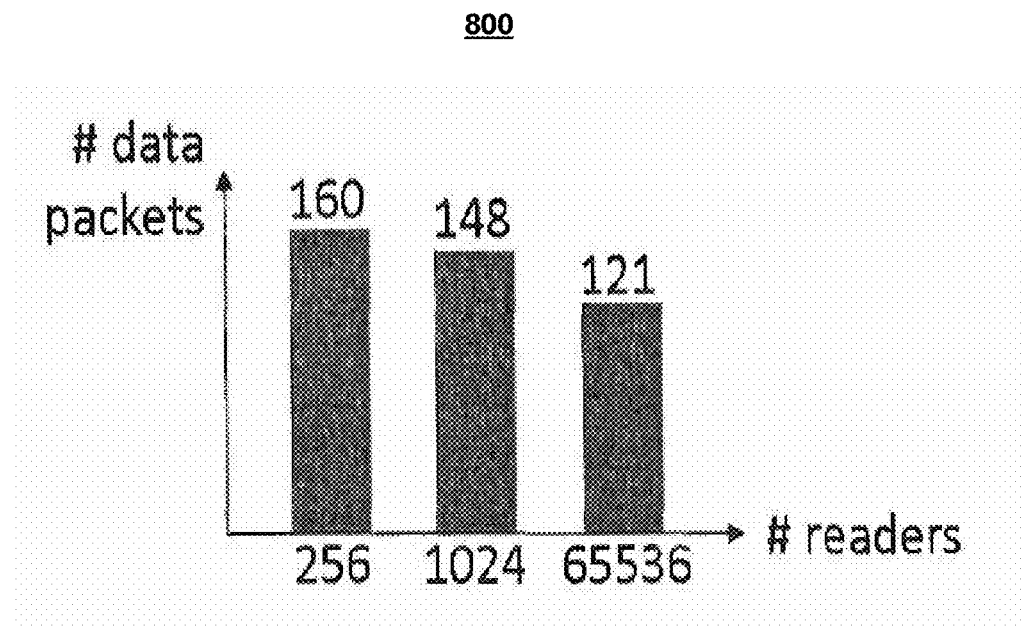
FIG. 8 is an exemplary graph illustrating an example storable amount of transactions on a RFID tag according to an exemplary RFID memory space of 4 kBits.

Referring to FIG. 8, an exemplary graph 800 illustrates the number of data packets on the vertical axis and the number of RFID interrogators on the horizontal axis based on using a 4 kbit on-chip memory 104 on the RFID tag 102.

In one exemplary implementation, the RFID interrogator 110 may be configured to write the data packet to the RFID tag 102 using the write command discussed above, where the authorization and other protocols are not needed. Instead, the write command is broadcast upon the occurrence of a RFID event in the RFID interrogator's writing area and any RFID tag 102 within the area is written to with the data packet. In some implementations, a short pause or delay may be used between two write processes to account for slow movement of RFID tags in the area and to avoid multiple unnecessary write actions. This may increase stability and integrity of the system. In one exemplary implementation, the RFID tag 102 may be configured to determine a last writer identifier that was written to the tag without the RFID interrogator 110 having to read this data from the RFID tag 102. In this manner, the RFID 102 may perform a lookup for the last writer identifier upon receiving the write command. If the last writer identifier is different, then the write command is processed. If the last writer identifier is not different, then the write command may be deleted or otherwise not processed such that no data is written to the RFID tag 102.

The RFID interrogator 110 may be configured to read the RFID tags 102 to obtain the stored data packets from the memory 104 at a designated time. For example, the tags may be read periodically such as, for example, every night. When the RFID tags 102 are read, then the data is cleared from the memory 104 to allow more data packets to be written to the RFID tags 102. Also, for instance, the RFID tags 102 may be read as the tag passes a specific location or past a specific RFID interrogator 110 such as one at a checkout counter of a store or at an exit of a warehouse.

The control module 116 may be configured to aggregate the data packets that are read from the RFID tags 102. In this manner, the aggregation of the data at the RFID interrogator 110 may relieve some of the burden on the central repository 118. In one exemplary implementation, all information related to a particular product or product type may be merged at a higher level of abstraction. This enables the transfer of pre-aggregated data into the central repository 118, which may be done at designated times to reduce the processing requirements and storage requirements at the central repository 118.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method for tracking events using a radio frequency identification (RFID) tag, the method comprising:
designating a bit window in a memory on a radio frequency identification (RFID) tag to record occurrences of a RFID event, the bit window having multiple bits, the RFID event occurring each time the RFID tag crosses into a writing area for a particular RFID interrogator;
marking one of the bits in the designated bit window each time the RFID event occurs; and
counting the number of occurrences of the RFID event by counting the -a number of marked bits in the designated bit window.

2. The method as in claim 1 wherein marking one of the bits in the bit window comprises receiving a write command at the RFID tag from a RFID interrogator without using a handshake between the RFID tag and the RFID interrogator.

3. The method as in claim 1 wherein marking one of the bits in the bit window comprises broadcasting a write command to write a bit to the RFID tag without reading any data from the RFID tag prior to broadcasting the write command.

4. The method as in claim 1 wherein marking one of the bits in the bit window occurs when the RFID tag crosses a writing area.

5. The method as in claim 1 further comprising reading the marked bits from the RFID tag.

6. The method as in claim 1 wherein:
designating the bit window in the memory on the RFID tag comprises reserving multiple bit windows in the memory on the RFID tag, the multiple bit windows each representing a different event to be tracked; and
marking one of the bits in the bit window comprises randomly marking one of the bits in one of the bit windows in response to an occurrence of a RFID event corresponding to the bit window.

7. A method for tracking events using a radio frequency identification (RFID) tag, the method comprising:
detecting a radio frequency identification (RFID) tag when the RFID tag crosses a writing area for a RFID interrogator, the RFID interrogator being associated with a unique writer identifier;
reading, by the RFID interrogator that detected the RFID tag, a last writer identifier from the RFID tag;
writing, by the RFID interrogator that detected the RFID tag, a data packet to the RFID tag when the last writer identifier does not match the unique writer identifier of the RFID interrogator that detected the RFID tag, the data packet comprising a timestamp and the unique writer identifier associated with the RFID interrogator that detected the RFID tag; and
storing, by the RFID interrogator that detected the RFID tag, the data packet on the RFID tag in a memory of the RFID tag, the memory being configured to store multiple data packets.

8. The method as in claim 7 further comprising reading the stored data packets from the RFID tag.

9. The method as in claim 8 further comprising aggregating the data packets related to a product.

10. The method as in claim 9 further comprising transferring the aggregated data packets to a central data repository.

11. The method as in claim 7 wherein writing the data packet comprises writing the data packet to the RFID tag using a block write command.

12. A system, comprising:
a radio frequency identification (RFID) tag that comprises an antenna and a memory, the memory comprising a designated bit window having multiple bits, the bit window being designated to record occurrences of a RFID event, the RFID event occurring each time the RFID tag crosses into a writing area for a particular RFID interrogator,
the particular RFID interrogator comprising an antenna and a radio frequency module, wherein the particular RFID interrogator is configured to communicate with the RFID tag and to mark one of the bits in the designated bit window in the memory each time a RFID event occurs; and
a control module that is configured to count the number of occurrences of the RFID event by counting the a number of marked bits in the designated bit window in the memory.

13. The system of claim 12 wherein the control module is a component of the RFID interrogator.

14. The system of claim 12 wherein the RFID interrogator is configured to read the number of marked bits from the RFID tag and to communicate the number of marked bits to the control module, the control module being a component of a remote central repository.

15. The system of claim 12 wherein the RFID interrogator is configured to randomly mark one of the bits in the bit window by broadcasting a write command to write a bit to the RFID tag without reading any data from the RFID tag prior to broadcasting the write command.

16. The system of claim 12 wherein:
the memory in the RFID tag comprises multiple bit windows, the bit windows each representing a different event to be tracked; and
the RFID interrogator is configured to randomly mark one of the bits in one of the bit windows in response to an occurrence of a RFID event corresponding to the bit window.

17. The system of claim 12 wherein the RFID tag is configured to randomly select which one of the bits is to be marked.

18. The system of claim 12 wherein the RFID interrogator is configured to randomly select which one of the bits is to be marked.

19. A system, comprising:
a radio frequency identification (RFID) tag that comprises an antenna and a memory;
a RFID interrogator comprising an antenna, a radio frequency module and a unique writer identifier, wherein the RFID interrogator is configured to:
detect, by the RFID interrogator, the RFID tag when the RFID tag crosses a writing area for the RFID interrogator,
read, by the RFID interrogator that detected the RFID tag, a last writer identifier from the RFID tag, and
write, by the RFID interrogator that detected the RFID tag, a data packet to the RFID tag when the last writer identifier does not match the unique writer identifier for the RFID interrogator that detected the RFID tag, the data packet comprising a timestamp and the unique writer identifier associated with the RFID interrogator that detected the RFID tag.

20. The system of claim 19 wherein:
the RFID tag is configured to store multiple data packets in the memory; and
the RFID interrogator is configured to read the stored data packets from the RFID tag.

21. The system of claim 20 wherein the RFID interrogator further comprises a control module that is configured to aggregate the data packets related to a product.

22. The system of claim 21 further comprising a central data repository, wherein the RFID interrogator is configured to transfer the aggregated data packets to the central data repository.

23. A radio frequency identification (RFID) tag, comprising:
an antenna that is configured to receive one or more commands;
a memory comprising a bit window having multiple bits, the bit window reserved to record occurrences of a RFID event, the RFID event occurring each time the RFID tag crosses into a writing area for a particular RFID interrogator; and
a control module that is configured to control the antenna and the memory and that is configured to receive and to process a write command to one of the bits in the bit window each time the RFID event occurs.

24. The RFID tag of claim 23 wherein the control module is configured to randomly select which one of the bits in the bit window is marked.

25. The RFID tag of claim 23 wherein the received write command includes which one of the bits in the bit window is marked.

26. The RFID tag of claim 23 wherein the control module is configured to receive and to process the write command without using a handshake with a RFID interrogator.

* * * * *